Dec. 22, 1964  A. W. CONOW ETAL  3,162,046
TEMPERATURE PROBE
Original Filed Aug. 12, 1960

ARTHUR W. CONOW,
ROBERT CHARLES HOWARD,
INVENTORS.

BY
Batchelor & Lewis

3,162,046
TEMPERATURE PROBE
Arthur W. Conow, La Mirada, and Robert Charles Howard, Costa Mesa, Calif., assignors to Giannini Controls Corporation, Duarte, Calif., a corporation of New York
Original application Aug. 12, 1960, Ser. No. 49,182. Divided and this application Sept. 22, 1961, Ser. No. 140,079
3 Claims. (Cl. 73—362)

This invention is concerned with means for sensing ram temperature, as is required, for example, in mechanism for computing the true relative density of the atmosphere surrounding an aircraft or other moving vehicle. This application is a division of our copending application Serial No. 49,182, filed August 12, 1960 and entitled "Compensated Air Density Computer."

True air density $D$ is related to static pressure $P_s$ and true air temperature $T$ by the relation:

$$\frac{D}{D_0} = \frac{P_s}{P_{s0}} \frac{T_0}{T} \tag{1}$$

where the subscript 0 denotes the value of the indicated quantity under standard conditions of temperature and pressure.

However, it is not possible in a rapidly moving vehicle to measure true static pressure and true air temperature directly. The indicated static pressure $P_{si}$ obtained from a conventional static pressure orifice, and the bulb temperature $T_p$ obtained from a conventional temperature probe both involve deviations which vary with the Mach number of the vehicle.

A primary general object of the invention claimed in the above identified copending application is to provide particularly simple, reliable and economical mechanism for compensating the described deviations and providing a substantially accurate indication of the true air density.

A more particular object of that invention is to provide a computation system in which corrections for bulb temperature and for indicated static pressure are introduced by a single servo loop, thereby greatly reducing the total number of components required in the system.

The present invention provides particularly effective means for sensing bulb temperature. Conventional temperature responsive resistive elements that have a positive temperature coefficient depart significantly from linearity of response. We have discovered that it is possible to connect two such elements in a passive network in such a way that the output is not only substantially linear but also varies with temperature more rapidly than has previously been possible without the use of active elements.

A full understanding of the invention and of its further objects and advantages will be had from the following description of an illustrative preferred manner of carrying it out. The particulars of that description, and of the drawings which form a part of it, are intended only as illustrative, and not as a limitation upon the scope of the invention, which is defined in the appended claims.

Figure 1:
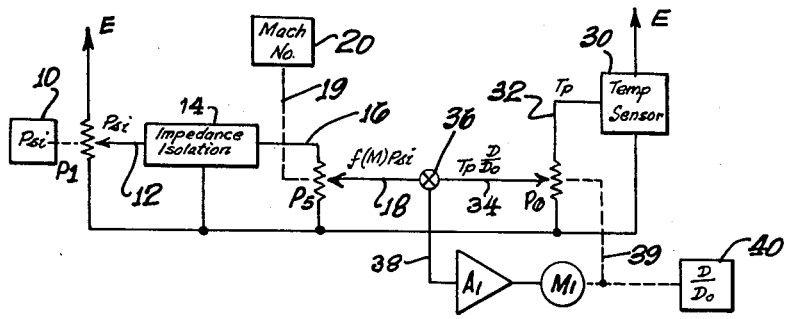
Figure 2:
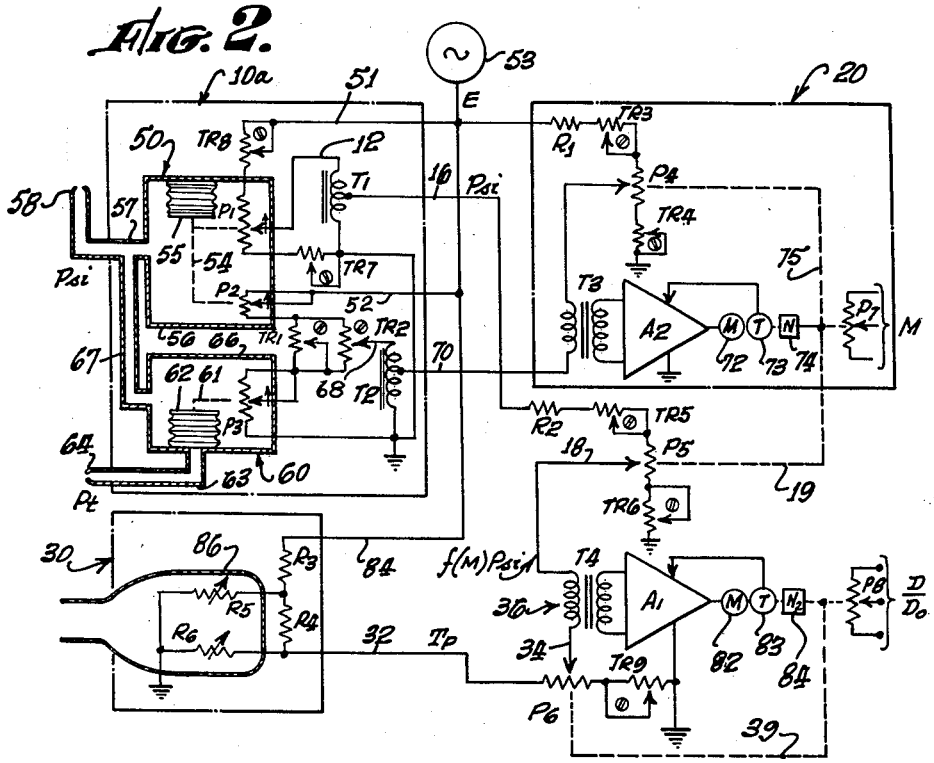

In the drawings:
FIG. 1 is a schematic block diagram representing an illustrative system in accordance with the invention; and
FIG. 2 is a schematic diagram showing further details of the illustrative system of FIG. 1.

In the block diagram of FIG. 1, the potentiometer P1 is supplied with a suitable reference voltage E. The potentiometer wiper is driven by mechanism indicated schematically at 10 in response to indicated static pressure. The output on line 12 is then proportional to $P_{si}$. After suitable impedance reduction at 14, the corresponding signal on line 16 is multiplied by a correction factor $f(M)$, which is a definite function of Mach number $M$. As represented, the signal on line 16 is supplied as reference voltage to the potentiometer P5, the potentiometer wiper being driven in accordance with Mach number via a suitable linkage indicated schematically at 19. That drive may utilize a Mach number computer 20 such as is ordinarily required also for other purposes in an air data computing system. The winding of potentiometer P5 is typically shaped in a known manner to provide the desired function $f(M)$, to be described. The voltage tapped from potentiometer P5 on the line 18 then represents the quantity $f(M)P_{si}$.

A voltage representing indicated bulb temperature $T_p$, which includes the deviation due to ram temperature rise, is developed on the line 32 by mechanism represented schematically at 30. That mechanism may be of conventional type, but preferably comprises the improved multiple unit temperature probe to be described. The voltage on line 32 is supplied as reference voltage to the servo-driven balance potentiometer P6. The voltage tapped from P6 on the line 34 is compared with that on line 18, already described, by the differential device indicated schematically at 36. The resulting difference voltage, if any, is supplied via the line 38 to the servo amplifier A1. The amplifier output controls the servo motor M1, driving potentiometer P6 via the linkage indicated at 39 in such a way as to maintain the difference voltage on line 38 substantially equal to zero. The resulting balance condition of the servo system can be expressed by the equation $$XT_p = P_{si} f(M) \tag{2}$$

where $X$ represents the transfer function of potentiometer P6.

In accordance with one aspect of the invention claimed in the above identified copending application, the single function $f(M)$, introduced by the correction potentiometer P5, incorporates both the required correction for converting indicated static pressure $P_{si}$ to true static pressure $P_s$, and the correction for converting the indicated or bulb temperature $T_p$ to true air temperature $T$. The entire computation of compensated air density may therefore be carried out with only a single servo loop.

For that purpose, potentiometer P5 is so constructed and driven from Mach computer 20 that the correction function $f(M)$ is of the form $$f(M) = \frac{T_0}{P_{s0}} \frac{f_p(M)}{f_t(M)} \tag{3}$$

where the ratio $T_0/P_{s0}$ is a constant; $f_p(M)$ is the ratio of true static pressure to indicated static pressure; and $f_t(M)$ is the ratio of the true air temperature to indicated or bulb temperature. Temperature correction ratio $f_t(M)$ can be expressed in the form $$f_t(M) = \frac{1}{1 + 0.2rM^2} \tag{4}$$

where $r$ is the recovery factor of the temperature bulb, which is typically equal to 0.85 for a conventional flush mounted temperature bulb. Since $r$ is essentially constant, $f_t(M)$ is a function of Mach number only, as indicated by the notation.

Pressure correction ratio $f_p(M)$ represents the error commonly known as the static pressure defect or static source position error. For common static systems the static defect is known to be a function of Mach number only, and can readily be determined experimentally by known procedures. Over the range of Mach numbers typically encountered in subsonic flight the total variation of $f_p(M)$ is approximately 10%. Potentiometer P5 can therefore readily be shaped by known methods to provide the required overall function defined in (3).

ith correction potentiometer P5 designed and driven
he described manner, Equation 2 may be rewritten
ollows:

$$X = \frac{T_0}{P_{s0}} \cdot \frac{P_{si} f_D(M)}{T_D f_t(M)} = \frac{P_s}{P_{s0}} \cdot \frac{T_0}{T} \quad (5)$$

paring Equations 1 and 5, the transfer function X
alance potentiometer P6 is seen to correspond to the
sity ratio $D/D_0$. An output device of any suitable
 can therefore be coupled to the servo drive 39, as
esentped at 40 in FIG. 2, to provide a signal of de-
d type representing D.

IG. 2 represents an illustrative practical system for
ying out the invention, wherein generally correspond-
parts are numbered as in FIG. 1. Although the
iculars of Mach number computer indicated at 20
IG. 1 are not, in themselves, a part of the present in-
ion, such a computer is included in illustrative form
IG. 2 for clarity of description of the overall con-
. Pressure responsive elements for controlling Mach
puter 20 are incorporated with static pressure trans-
er 10 of FIG. 1 in the transducer assembly 10a of
. 2.

s shown illustratively in FIG. 2, transducer assembly
 comprises the static pressure transducer 50 and the
rential pressure transducer 60. Transducer 50 com-
es two electrically independent potentiometers P1 and
which are supplied with an alternating current refer-
 voltage E via the lines 51 and 52, respectively, from
itable source indicated schematically at 53. The po-
iometer wipers are driven via suitable coupling means
y the evacuated capsule 55. The exterior of capsule
s exposed to indicated static pressure supplied to the
rior of the housing 56 via the conduit 57 from the
c orifice 58. That pressure $P_{si}$ differs from the true
c pressure $P_s$ by a definite static defect factor, which,
already explained, is a function of Mach number.
 output line from potentiometer P1 thus carries a volt-
proportional to $P_{si}$, and corresponds to line 12 of
. 1. Trimming resistors TR7 and TR8 are preferably
nected in series with the winding of P1 to facilitate
stment of the system and promote interchangeability
he components.

ifferential pressure transducer 60 comprises a poten-
eter P3, driven via the linkage 61 by a pressure
ule 62. Capsule 62 is driven in any suitable man-
in response to the difference between total pressure
nd indicated static pressure $P_{si}$. For example, in
 structure shown, the interior of capsule 62 is sup-
d with ram or total pressure $P_t$ via the conduit 63
n a suitable total pressure orifice indicated at 64.
 exterior of capsule 62 is exposed to indicated static
sure $P_{si}$, supplied to the interior of the housing 66
n orifice 58 via conduits 57 and 67. The wiper of
ntiometer P3 is therefore moved in proportion to the
cated differential pressure $q_{ci} = P_t - P_{si}$.
or Mach number computation potentiometers P2 and
are connected as rheostats in series between reference
age line 52 and ground. The trimming resistor TR1
the trimming potentiometer TR2 are connected in
llel between P2 and P3. The voltage tapped from
 on the line 68 is a function of the pressure ratio $$\frac{q_{ci}}{q_{ci} + P_{si}/K} \quad (6)$$

re K is the ratio of the resistance per unit pressure
otentiometer P3 to that in P2. With suitable selec-
of K, the pressure ratio (6) can be shown to pro-
a nearly linear measure of Mach number M over any
h range that is ordinarily required. The small static
ct errors in $q_{ci}$ and $P_{si}$ are compensated by shaping
ntiometer P4, to be described. Particularly when
ble of appreciable length is required between pres-
transducer unit 10a and other portions of the sys-
, it is desirable to provide impedance isolation for
the outputs from lines 12 and 68, as indicated at 14
for line 12 in FIG. 1. The autotransformers T1 and T2
in FIG. 2 typically provide approximately 10:1 voltage
reduction, or 100:1 impedance reduction. The source
impedance as viewed by the capacity of output lines 16
and 70 in a shielded cable is thereby reduced to an es-
sentially negligible value, even for a cable as long as 200
feet, for example.

The voltage on line 70, representing pressure ratio (6),
is compared by the summing transformer T3 to the volt-
age developed at the wiper of the balance potentiometer
P4 in Mach computer 20. The winding of P4 is sup-
plied with reference voltage from source 53 via the volt-
age dropping resistor R1, and is provided with series con-
nected trimmers TR3 and TR4 which adjust the end
points. The error voltage, as derived from the secondary
of summing transformer T3 is supplied as input to servo
amplifier A2. The amplifier output controls the servo-
motor 72 and feedback tachometer 73, driving the wiper
of balance potentiometer P4 via the gear reduction 74
and the linkage 75. The winding of P4 is suitably shaped
to compensate the slight lack of linearity between the
signal on line 70, representing pressure ratio (6), and the
corresponding Mach number M. The movement of drive
75 thus represents M directly, and may be arranged to
drive any desired type of Mach number output device,
such as the output potentiometer P7, for example. The
servo drive 75 is coupled via linkage 19 to the wiper
of potentiometer P5 of the air density computer, and
drives it in accordance with Mach number, as already
described in connection with FIG. 1.

Turning now more specifically to the air density com-
putation circuit as shown in FIG. 2, the signal on line
16 representing $P_{si}$ is supplied via dropping resistor R2 to
the winding of potentiometer P5, which is preferably pro-
vided with appropriate end set trimming resistors TR5
and TR6. The winding of potentiometer P5 is shaped
to the correction function $f(M)$, already described. The
voltage developed on line 18 by the wiper of P5, driven
in accordance with Mach number, is proportional to the
product of $P_{si}$ and that correction function. That voltage
is supplied to one end of the primary of summing trans-
former T4, which corresponds to differential device 36
of FIG. 1.

The other end of the primary of transformer T4 receives
on line 34 the voltage tapped from servo balance poten-
tiometer P6. The winding of P6 is provided with the
trimming resistor TR9, and is supplied via line 32 with
a voltage representing bulb temperature, as already de-
scribed. The error voltage developed by the secondary
of T4 is supplied as input to servo amplifier A1. The
servo loop typically includes the motor 82, tachometer
83 and gear reduction 84, and drives the wiper of P6 via
linkage 39. As already explained, the wiper movement
corresponds directly to the true air density ratio $D/D_0$.
Hence any desired linear output device, such as the out-
put potentiometer P8, may be coupled to linkage 39 to
provide an air density output signal of desired type.

In accordance with the present invention, temperature
transducer 30, as shown in FIG. 2, comprises a plurality
of temperature responsive resistive elements, shown for
illustration as the two elements R5 and R6, which are
typically pure nickel temperature bulbs of conventional
form. Elements R5 and R6 are mounted in a suitable
housing 86 exposed to ram air in a manner correspond-
ing to the usual mounting of a single temperature bulb.
The two elements are thus both at the same ram air tem-
perature. They are connected with other passive imped-
ance elements, represented by the resistances R3 and R4,
to form an electrical network of any desired configura-
tion. That network is supplied with the reference volt-
age E via the line 84. In the preferred network shown,
resistances R3 and R5 may be considered to form a volt-
age divider for the reference voltage E, with R4 and R6
series connected in shunt to R5 and forming a voltage divider for the voltage signal developed at the junction of R3 and R5. The output $T_p$ on line 32 is taken from the junction of R4 and R6 and may be expressed as a product of E by two functions representing the actions of the respective voltage dividers:

$$T_p = E \frac{R3}{R3+R5(T)} \frac{R4}{R4+R6(T)} \quad (7)$$

where the dependence of R5 and R6 upon T has been indicated explicitly for clarity.

We have discovered that use of a plurality of temperature bulbs connected in a suitable passive network, of which that shown is illustrative, permits two specific short-comings of previous temperature transducers to be simultaneously corrected. Moreover, that is accomplished without reliance upon active elements, such, for example as amplifying circuits or additional servo loops.

The temperature response of conventional resistive elements with positive temperature coefficient, such as pure nickel, is typically not as large as is desirable, particularly for the present computing system. Moreover, the resistance of such elements increases a little faster than linearly with temperature, approximately in accordance with the formula $$R(T) = R_0 + AT + BT^2 \quad (8)$$

The present invention provides improved overall response that differs typically from the form (8) both by making the coefficient B substantially zero, so that the response is essentially linear; and by simultaneously increasing the value of the coefficient A. By suitable selection of component values, the value of A may be increased by nearly a factor of two if linearity of response is not required. For illustrative purpose represented by the overall system of FIGS. 1 and 2, it is preferred to make the response linear and accept a smaller increase in slope. That may typically be done by selecting the values of R3 and R4 substantially equal to 0.37 and 3.7, respectively, times the average value of R5 and R6 over the temperature range of operation. For example, if the resistance of temperature elements R5 and R6 varies from 68 to 94 ohms over the operating temperature range, as is true of typical nickel elements, excellent performance is obtained with R3 and R4 equal to approximately 30 ohms and 300 ohms, respectively.

In the operation of the illustrative system of FIG. 2, the voltage on line 18 represents the product of $P_{s1}$ by the correction factor defined by Equation 3. That correction factor may be considered as the ratio of two correction factors, one representing the correction needed to convert indicated static pressure to true static pressure, and the other representing the correction needed to convert indicated, or bulb temperature to true air temperature. By introducing both of those correction elements at the same component, namely the winding of potentiometer P5, the single servo loop containig amplifie A1 can operate directly on the uncorrected indicated temperature signal on line 32. Yet the output transduce P8, typically driven directly from that loop, represents value of computed air density that is based on correcte temperature as well as corrected static pressure.

We claim:
1. In a temperature probe for sensing atmospheric ran temperature, the combination of two temperature respon sive resistive elements adapted to be exposed to ram tem perature, two impedance means, a source of reference vol age, circuit means connecting one impedance means an one element in series with the voltage source, circu means series connecting the other impedance means an the other element in shunt to said one element, and outpu means responsive to the votlage at the junction of sai other impedance means and said other element.

2. In a temperature probe for sensing atmospheri ram temperature, the combination of two temperatur responsive resistive elements adapted to be exposed t ram temperature, a source of reference voltage, fir: circuit means including one element and acting to deriv a first signal voltage from said reference voltage, secon circuit means including the other element and acting t derive from said first signal voltage a second signal vol age that varies approximately linearly with ram tempera ture, and output circuit means responsive to the secon signal voltage.

3. In a temperature probe for sensing atmospheri ram temperature, the combination of two temperatur responsive resistive elements adapted to be exposed t ram temperature and having approximately equal averag impedance values, first and second impedance mear having impedance values approximately equal, respec tively, to one third and three times said average impedanc values, a source of reference votlage, circuit means cor necting the first impedance means and one element i series with the voltage source, circuit means series cor necting the second impedance means and the other ele ment in shunt to said one element, and output mear responsive to the voltage at the junction of said othe impedance means and said other element, the last sai voltage varying approximately linearly with ram ten perature.

References Cited in the file of this patent
UNITED STATES PATENTS

| | | |
|---|---|---|
| 2,533,286 | Schmitt | Dec. 12, 195 |
| 2,567,755 | Amsler | Sept. 11, 195 |
| 2,649,012 | Schnelle | Aug. 18, 195 |
| 2,862,176 | Lustig | Nov. 25, 195 |
| 2,889,988 | Toth et al. | June 9, 195 |